United States Patent [19]

Privett

[11] Patent Number: 4,475,307
[45] Date of Patent: Oct. 9, 1984

[54] APPARATUS FOR DISPENSING A LIQUID

[76] Inventor: Eric B. Privett, P.O. Box 106, Honeydew 2040, South Africa

[21] Appl. No.: 412,819

[22] Filed: Aug. 30, 1982

[30] Foreign Application Priority Data

Sep. 3, 1981 [ZA] South Africa ............ 81/6115

[51] Int. Cl.³ .................... A01G 27/00; B67D 5/08
[52] U.S. Cl. ........................................ 47/79; 222/52
[58] Field of Search ............ 47/59, 62, 79, 80; 222/52

[56] References Cited

U.S. PATENT DOCUMENTS

| | | | |
|---|---|---|---|
| 1,670,164 | 5/1928 | Pfahl | 47/62 X |
| 2,211,445 | 8/1940 | Tiedjens | 47/79 |
| 3,168,224 | 2/1965 | Rios | 47/79 X |
| 3,550,319 | 12/1970 | Gaines | 47/79 |
| 3,603,034 | 9/1971 | Maxwell-Stewart | 47/38 |
| 3,900,134 | 8/1975 | Larson | 47/79 X |
| 3,906,667 | 9/1975 | Williams | 47/38 |
| 4,211,037 | 7/1980 | Green | 47/80 |

FOREIGN PATENT DOCUMENTS 2537135 2/1977 Fed. Rep. of Germany .
2854198 7/1980 Fed. Rep. of Germany .

Primary Examiner—Robert E. Bagwill
Attorney, Agent, or Firm—Scully, Scott, Murphy & Presser

[57] ABSTRACT

The invention relates to an apparatus for dispensing liquid to plants, the apparatus comprising a container for housing the plants, a reservoir for the liquid, and a conduit connecting the interior of the container to the interior of the reservoir, the reservoir being pivotable between an operational position in which liquid flows by gravity from the reservoir into the container and an inoperative position in which excess liquid in the container flows by gravity from the container into the reservoir and in which inoperative position the liquid is stored, and including means to cause the reservoir to move automatically from its operational to its inoperative position once a predetermined quantity of liquid has been dispensed.

11 Claims, 5 Drawing Figures

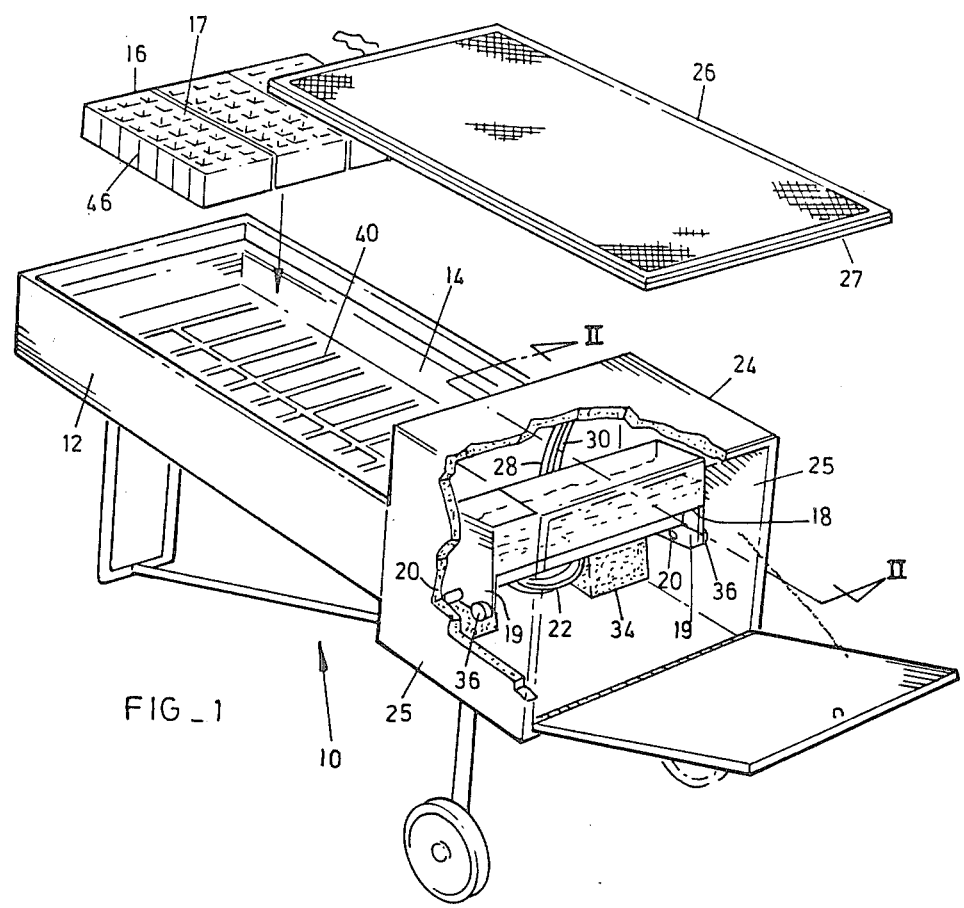
FIG_1
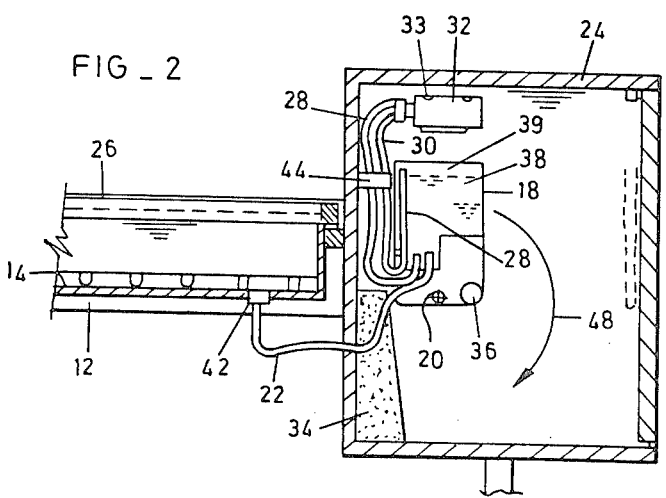
FIG_2

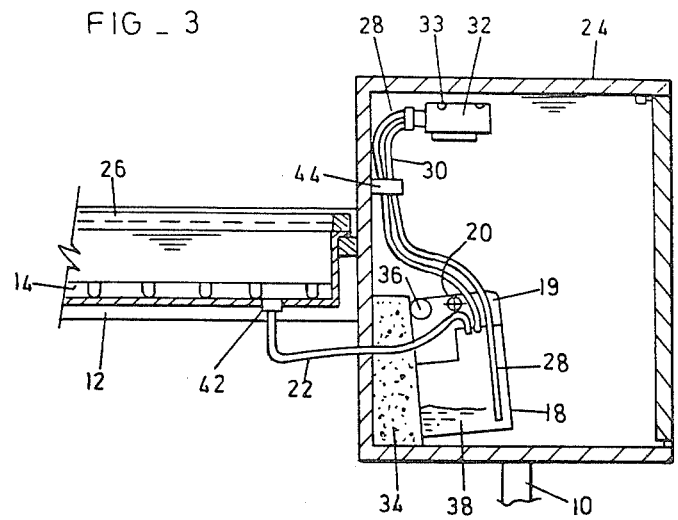
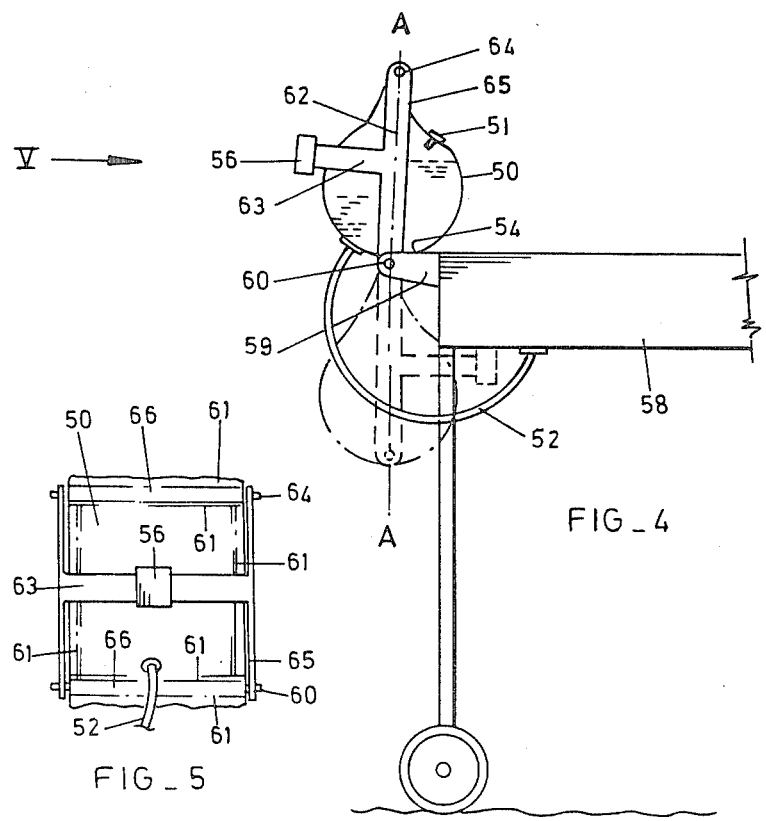

APPARATUS FOR DISPENSING A LIQUID

FIELD OF THE INVENTION

This invention relates to the dispensing of liquids to plants.

BACKGROUND TO THE INVENTION

It is well-known to grow plants (including seedlings) in portable seed trays, pots and the like. These plants must receive a periodic supply of liquid necessary for growth and sustenance. In a wide range of applications extending from commercial nurseries through domestic greenhouses to indoor pot plants it is convenient to supply the plants with liquid on an automatic basis.

Automatic irrigation systems suitable for plants in seed trays, pots and the like have been developed but these systems have disadvantages. Three disadvantages are commonly found. One is that the system requires a pump, which adds to the expense of the system and complicates its installation and use. Secondly, the period of watering and hence the amount of liquid supplied cannot easily be controlled. Further, a spray is often used, making the system impractical for use in the home. U.S. Pat. No. 4,211,037 and German Offenlegungsschrift No. 2537135 both disclose an automatic watering system which requires a pump to give the head necessary to supply the liquid. Although both systems provide a drain, and a timer can be used in conjunction with the pump to control the liquid supply, the necessity for a pump introduces undesirable expense and complexity. On the other hand U.S. Pat. No. 3,906,667 and German Offenlegungsschrift No. 2854198 disclose systems of dispensing liquids to plants which do not require the use of a pump but these systems result in a continuous supply of liquid unless the supply is exhausted or unless there is human intervention.

It is an object of the present invention to provide an apparatus for dispensing the required liquids to plants in plant containers which overcomes or mitigates these disadvantages.

SUMMARY OF THE INVENTION

The invention provides an apparatus for dispensing a liquid to plants, the apparatus comprising a container for housing the plants, a reservoir for the liquid, and a conduit connecting the interior of the container to the interior of the reservoir, the reservoir being pivotable between an operational position in which the liquid in the reservoir flows by gravity along the conduit into the container and an inoperative position in which excess liquid in the container flows by gravity along the conduit into the reservoir and in which inoperative position the liquid is stored, and including means to cause the reservoir to move automatically from its operational to its inoperative position once a predetermined quantity of liquid has been dispensed.

In a preferred version the reservoir is of a rigid material and is provided with means to prevent the creation of air locks and hence to facilitate the flow of liquid to and from the reservoir.

In another preferred version the reservoir is made of a flexible collapsible material and is fitted with a bleed valve for venting air trapped in the reservoir. In this form the reservoir is conveniently made of a plastics material supported by stiffening members which hold it in place in a frame, one stiffening member forming a pivot shaft about which the reservoir may tilt. Alternatively the reservoir in this version may be held in a closed box-like frame.

Preferably the means for automatic movement from the operational to the inoperative positions comprises a mass provided by the reservoir itself and its liquid contents, so located and mounted for movement about a pivot axis that, in the operational position, it provides a retaining moment which tends to hold the reservoir in the operational position; and a further mass so located and mounted about the pivot axis that it provides a counter-moment acting in the opposite direction to the retaining moment and of such magnitude that it will overcome the retaining moment when a predetermined quantity of liquid has been dispensed.

In this form the mass providing the counter-moment is adjustable in position or quantity so that the predetermined quantity of liquid dispensed can be varied. Thus the moment may be varied by adding or subtracting mass or changing the distance of the mass from the pivot axis.

The container may be adapted to receive seed trays or the like and in some forms may have drainage channels provided in its base to facilitate the supply to, and drainage of, the liquid at the base of the seed trays.

BRIEF DESCRIPTION OF THE DRAWINGS

FIG. 1 is an exploded partly fragmented perspective view of the major parts of an apparatus of the invention showing a container for receiving seed trays and a rigid reservoir enclosed in a housing;

FIG. 2 is a fragmentary sectional view along the line II—II in FIG. 1 showing the reservoir in the operational position;

FIG. 3 is a fragmentary section view along the line II—II in FIG. 1 showing the reservoir in the inoperative position;

FIG. 4 is a side elevation view of an alternative embodiment incorporating a flexible, collapsible reservoir without a housing; and FIG. 5 is a view of the supported reservoir in FIG. 4 as seen in the direction of the arrow V in FIG. 4.

DESCRIPTION OF PREFERRED EMBODIMENTS

Two alternative preferred embodiments are discussed below. The major difference between these two embodiments is that in the first a rigid reservoir is used while in the second a flexible plastic reservoir is used. The embodiment which incorporates the rigid reservoir is described first. Thereafter the alternative embodiment using the flexible plastic reservoir is described. The principle of operation of these embodiments follows the descriptions.

FIGS. 1, 2 and 3 illustrate the embodiment incorporating a rigid reservoir. FIG. 1 shows the embodiment comprising a wheeled frame 10 supporting a container 12 and a fixed housing 24. The housing 24 houses a reservoir 18 and other operational equipment which will be described later. The interior of the reservoir 18 is connected by means of a flexible conduit 22 to the interior of a liner 14 which is supported in the container 12. Seed trays 16 fit into the liner 14. A gauze cover 26 is shown which may be used to shield or protect small plants in the seed trays 16. This cover 26 is conveniently provided with a rubber seal 27.

In FIG. 1 commercial seed trays 16 of the type comprising a number of compartments 17 each shaped as inverted pyramids are shown. The inverted pyramids hold soil and each compartment 17 holds one plant. The bases of the compartments 17 are provided with apertures each plugged with a fine cellular foamed plastic which is highly hygroscopic. This allows any liquid in contact with the bases of the inverted pyramids to wet the soil in the compartments 17 whilst preventing soil from dropping from the compartments 17 into the liner 14. The trays 16 are provided with grooves 46 so that when the trays are packed in the liner 14 air can move along the grooves 46. The liner 14 may also hold other types of seed trays or pots.

As will be described in more detail later the invention involves flooding the floor of the liner 14 so that liquid is supplied to the bases of all the compartments 17 in the trays 16. In order to aid the complete flooding of the floor of the liner 14 with liquid it is provided with channels 40 which slope towards the drain 42 as shown in FIGS. 2 and 3. The liner 14 may conveniently be made from polystyrene, which is easy to form. Alternatively instead of a liner 14 the conduit 22 can connect the interior of a watertight box-like container 12 directly to the interior of the reservoir 18. Such a box-like container 12 would have the channels 40 provided in its floor thus doing away with the need for a liner 14.

Returning now to the operational apparatus housed in the housing 24, this can best be described by referring to FIGS. 2 and 3. These figures show a reservoir 18 made from a rigid material such as perspex. The reservoir 18 has end flanges 19, to each of which is attached a pivot pin 20 that is rotatable in an aperture (not shown) in the side wall 25 of the housing 24. This arrangement allows pivotal movement of the reservoir 18 between the operational position shown in FIG. 2 and the inoperative position shown in FIG. 3.

In the operational position the reservoir 18 rests against a stop 44 and in the inoperative position the reservoir 18 rests against a sponge 34. The reservoir 18 is constructed so that the centre of gravity of the reservoir 18 and its content does not act directly through the pivot pin 20 but is offset from the pin when the reservoir is in the operational position. This offset of the weight of the reservoir and its liquid contents 38 is such that in the operational position a retaining moment is provided in the counter-clockwise direction in FIG. 2.

On the other hand adjustable weights 36 are positioned on the flange 19 so that these weights 36 provide a counter-moment in the direction of the arrow 48. The counter-moment is adjusted either by varying the magnitude of the weights 36 or by varying the distance of the weights 36 from the pivot pin 20.

In addition to the conduit 22 connecting the interior of the reservoir 18 to the interior of the liner 14 two further tubes 28,30 are provided which connect the interior of the reservoir to the interior of a bottle 32 provided with openings 33. Note that the tube 28 extends in FIG. 2 upwards in the reservoir 18 into the space 39 above the liquid 38 whereas the tube 30 terminates at the base of the reservoir 18 as seen in FIG. 2. This arrangement ensures that one of these tubes 28,30 terminates above the level of the liquid 38 in the reservoir 18 when the reservoir 18 is in both the operational and inoperative positions. The bottle 32 is provided to catch any spillage of liquid which is 'blown-back' along the tubes 28,30. The bottle 32 will only be necessary in special circumstances. The tubes 28,30 may be replaced by suitably located one-way air valves.

An alternative embodiment of the apparatus is shown in FIGS. 4 and 5. This embodiment uses a flexible, collapsible reservoir 50 of a plastics material. The interior of this reservoir 50 is connected to a container 58 by means of a flexible conduit 52. The container 58 is conveniently similar to that described above and illustrated in FIG. 1. Thus the conduit 52 connects the interior of the reservoir 50 to the interior of a liner (which is not shown) adapted to hold seed trays.

In this embodiment the reservoir 50 is held in a frame 62 comprising two metal struts 65 connected by a metal yoke 63. The reservoir 50 and the way in which it is supported in the frame 62 are best seen in FIG. 5. The reservoir 50 is manufactured by welding two plastic sheets along the seams 61 to form a sealed reservoir 50 provided with elongate recesses 66 along two opposing edges. Rods 60,64 fit into these recesses and extend from them. The struts 65 of the frame 62 are provided with holes near their extremities such that the rods 60,64 fit into these holes. The reservoir 50 is thus supported between the rods 60,64 and held in the frame 62. The reservoir 50 may be provided with a valve 51 which may be used to vent any air which becomes trapped in the reservoir 50.

Instead of this frame 62 the reservoir could be housed in a box. Such a box frame would provide better all-round support for the reservoir 50.

FIG. 4 shows the reservoir in the operational position (in solid lines) and in the inoperative position (in dashed lines). Two flanges 59 protrude from the end of the container 58. The flanges 59 are provided with holes which match those on the struts 65 so that the rod 60 passes through the holes in the flanges 59, the holes in the struts 65 and the recess 66 in the reservoir 50. Thus the rod 60 can act as a pivot pin when the reservoir moves from one position to another. Bushes may be provided to facilitate movement of the reservoir.

In the operational position the frame 62 rests against a stop 54. This stop 54 is such that in the operational position the weight of the contents of the reservoir 50 acts to provide a retaining moment about the pivot pin 60 in the clockwise direction in FIG. 4. On the other hand an adjustable weight 56 is provided on the yoke 63 which causes a counter-moment which acts in the counter-clockwise direction in FIG. 4 when the reservoir 50 is in the operational position. The weight 56 may be adjusted by varying the magnitude of the weight or by varying the distance of the weight from the pivot rod 60.

OPERATION

Both the embodiments described above operate on the same principle. The major difference is that in the embodiment using a flexible collapsible reservoir 50 there is no need for the tubes 28,30 which are necessary for the successful operation of the embodiment using the rigid reservoir 18. The operation of the embodiment using the rigid reservoir will be discussed below. It will be noted that if a flexible plastic reservoir 50 is used the reservoir collapses as liquid is dispensed from the reservoir and expands as the reservoir 50 receives liquid.

In order to fill the reservoir, the cover 26 and at least one tray 16 are removed from the container 12, with the reservoir lowered in the inoperative position (FIG. 3). The liquid, which may conveniently be a water-based solution including nutrients, is poured into the liner 14 and flows along the channels 40, through the drain 42, and along the conduit 22 into the reservoir 18. The air displaced from the reservoir is vented through the tube 30 which leads to the bottle 32.

When one wishes to supply liquid to the plants, the reservoir 18 is moved manually into the operational position shown in FIG. 2. In this position the weight of the liquid 38 establishes a retaining moment about the pivot pin 20 in the anti-clockwise direction in FIG. 2 and the reservoir rests in place against a stop 44. The weights 36 provide a counter-moment and, once a pre-determined volume of liquid has flowed through the conduit 22 into the liner 14 and along the channels 40 to supply liquid to the plants in the trays 16, the counter-moment overcomes the retaining moment and the reservoir pivots as shown by the arrow 48 into the inoperative position. The sponge 34 cushions the impact of the reservoir 18. The counter-moment provided by the weights 36 is adjustable. The adjustment may be achieved by adding or subtracting weights 36 and thus varying the counter-moment or by changing the distance of the weights 36 from the pivot axis 20 and thus varying the counter-moment. The quantity of liquid 38 dispensed from the reservoir 18 before it reverts to the inoperative position is thus predetermined by the adjustable weights 36.

In the operational position shown in FIG. 2 the breather tube 28 allows air to flow into the increasing volume 39 above the liquid 38 in the reservoir 18. The bottle 32 is used to trap any liquid trapped in the breather tubes 28,30 which might otherwise spill into the housing 24. The bottle 32 is open to atmosphere through holes 33 and does not form a sealed unit.

It can thus be seen that the apparatus facilitates the supply of a predetermined volume of liquid to the plants in the seed trays 16, pots or the like which are placed in the liner 14. The predetermined quantity of liquid which is to be dispensed to the liner 14 can be varied by adjusting the weights 36. Adjusting the weights 36 so as to vary the counter-moment results in an adjustment in the quantity of fluid which flows from the reservoir before it reverts to the inoperative position.

The embodiments thus provide for automatic cessation of watering of plants and there is no need for the provision of pumps fitted with timers. All that is required is that the watering be initiated by placing the reservoir into the operational position. The duration of the supply of liquid to the container can also be varied by clamping the conduit connecting the reservoir to the container and thus restricting flow. Another advantage provided by the apparatus is that liquid which is not used is returned to the reservoir and re-used. Thus nutrients in the liquid are not wasted. Yet another advantage of the apparatus is that the liquid can be shielded from light so as to prevent algae growth.

I claim:

1. An apparatus for dispensing liquids to plants, the apparatus comprising: a container for housing the plants; a rigid reservoir for the liquid; a conduit connecting the interior of the container to the interior of the reservoir, the reservoir being pivotable between an operational position in which liquid flows by gravity from the reservoir into the container and an inoperative position in which excess liquid in the container flows by gravity from the container into the reservoir, and in which inoperative position liquid is stored; the reservoir and its liquid contents providing a mass which is so located and mounted about the pivot axis that, in the operational position, it provides a retaining movement which tends to hold the reservoir in the operational position; a further mass which is located and mounted about the pivot axis that it provides a counter-moment acting in the opposite direction to the retaining moment, the counter-moment being of sufficient magnitude to overcome the retaining moment once a pre-determined quantity of liquid has been dispensed to cause the reservoir to move to the inoperative position; and vent means which vent the air above the liquid in the reservoir so that the pressure in the liquid in the reservoir is maintained substantially at atmospheric pressure.

2. An apparatus according to claim 1 in which the vent means comprises two tubes, one to be adapted to allow air to enter the space above the liquid when the reservoir is in the operational position and the other tube being adapted to allow air flow from the space above the liquid when the reservoir is in the inoperative position.

3. An apparatus according to claim 1 in which the vent means comprises two one-way air valves, one valve being adapted to allow air to flow into the space above the liquid when the reservoir is in the operational position and the other valve being adapted to allow air to flow from the space above the liquid when the reservoir is in the inoperative position.

4. An apparatus according to claim 1 in which the container is adapted to receive seed trays, pots or the like and has drainage channels provided in its base to ensure distribution of the liquid throughout the container.

5. An apparatus according to claim 4 in which the drainage channels slope downwardly and lead gravitationally to a drain to which an end of the conduit is connected.

6. An apparatus for dispensing liquid to plants, the apparatus comprising: a container for housing the plants; a reservoir of flexible material for the liquid; a conduit connecting the interior of the container to the interior of the reservoir, the reservoir being pivotable between an operational position in which liquid flows by gravity from the reservoir into the container and an inoperative position in which excess liquid in the container flows by gravity from the container into the reservoir, and in which inoperative position liquid is stored; the reservoir and its liquid contents providing a mass which is so located and mounted about the pivot axis that, in the operational position, it provides a retaining moment which tends to hold the reservoir in the operational position; a further mass which is so located and mounted about the pivot axis that it provides a counter-moment acting in the opposite direction to the retaining moment, the counter-moment being of sufficient magnitude to overcome the retaining moment once a pre-determined quantity of liquid has been dispensed to cause the reservoir to move to the inoperative position; and wherein the reservoir is arranged to collapse as dispensing proceeds and to expand as the reservoir receives liquid.

7. An apparatus according to claim 6 in which the reservoir is supported by a rigid frame.

8. An apparatus according to claim 6 in which the reservoir is supported in a rigid frame in the form of a closed box housing the reservoir.

9. An apparatus according to claim 6 in which the reservoir is supported in a rigid frame comprising two substantially parallel struts spaced apart by a yoke and provided near their extremeties with holes positioned to receive rods engagable with opposing edges of the reservoir.

10. An apparatus according to claim 6 in which the container is adapted to receive seed trays, pots or the like and has drainage channels provided in its base to ensure distribution of the liquid throughout the container.

11. An apparatus according to claim 10 in which the drainage channels slope downwardly and lead gravitationally to a drain to which an end of the conduit is connected.

* * * * *